(No Model.)

J. H. BENTLEY.
Broiler.

No. 242,424.  Patented June 7, 1881.

Witnesses.  Inventor.
H. S. Talbot  John H. Bentley,
W. R. Marble  By Sylvenus S. Walker
  Attorney

UNITED STATES PATENT OFFICE.

JOHN H. BENTLEY, OF EAST CAMBRIDGE, ASSIGNOR OF ONE-HALF TO ANTONIO E. BRUM, OF SOMERVILLE, MASSACHUSETTS.

BROILER.

SPECIFICATION forming part of Letters Patent No. 242,424, dated June 7, 1881.

Application filed October 29, 1880. (No model.)

*To all whom it may concern:*

Be it known that I, JOHN H. BENTLEY, of East Cambridge, in the county of Middlesex and State of Massachusetts, have invented certain new and useful Improvements in Broilers, of which the following is a specification.

The objects of my invention are to provide a broiler for cooking meat, fish, &c., and avoid the disagreeable odors entering the room, and also avoid the exposure of hands and face to heat, as with those heretofore constructed and now in general use.

My invention consists in the construction, combination, and arrangement of the several parts forming the device, as hereinafter more fully described and set forth.

Figure 1:
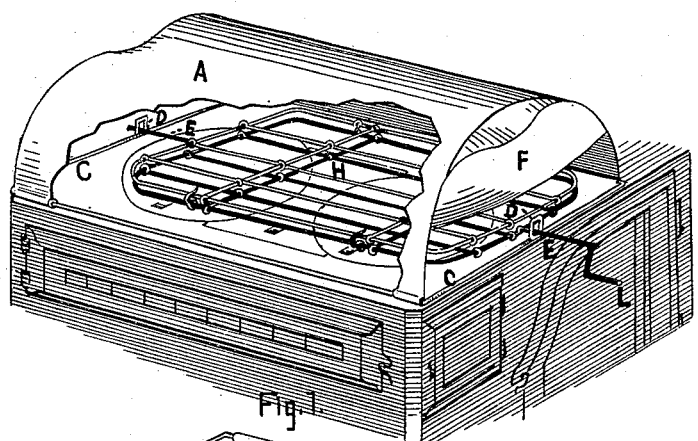
Figure 2:
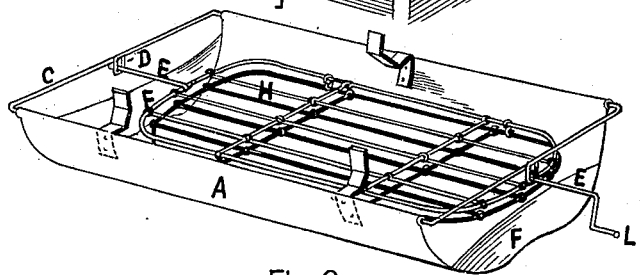
Figure 3:
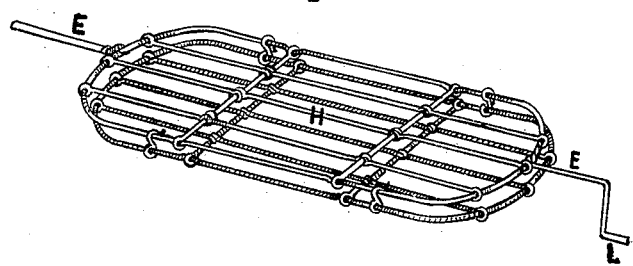

Figure 1 represents a perspective view of my invention as when in use upon a cooking-stove. Fig. 2 represents a similar view of the same removed and turned upside down. Fig. 3 represents a similar view of the broiler-frames removed from the cover.

A represents a semi-cylindrical cover, which fits over the opening formed in the top of a stove or range by removing two covers and the cross-piece, and rests upon the top portion of the stove surrounding such opening, and is held in position thereon by means of the bent angle projections B B B, which fit within the said opening.

The bottom edge of the cover A, at each end, is provided with a wire, C, which extends across or connects the opposite sides thereof, and is provided at the center of the open ends with a narrow upright loop, D, which forms a guide and bearings for the journals E E, which are located at opposite ends of the broiler-frames H, which frames are hinged and clasped together in any suitable manner.

It will be seen that the cover A at each end is bent downward and inwardly, forming ends F F, which serve, when the cover is reversed, as shown in Fig. 2, to retain any juices which may fall from the meat after being cooked and before its removal from the hinged broiler-frames H, which are opened while within the cover A, and then the meat or other contents cooked are removed therefrom. To remove the broiler-frames H from the cover A, draw the handle or crank L outward, then remove the opposite journal E of the frame H from the narrow loop D, then draw the frame H in the opposite direction, when the other journal, E, and handle or crank L will pass through the opposite end loop, D, and the parts are separated.

It will be seen that the semi-cylindric cover A is partially open at each end, so as to admit a draft or current of air to pass inwardly to the fire in the stove, and thereby prevent the escape of smoke or odors, and such open ends permit the contents of the broiler to be seen as the cooking proceeds, and admits of frequent turning of the said broiler-frames, so as to evenly cook both sides of the food without removal.

The object of constructing the bearings for the journals of the broiler-frames in the form of vertical loops not only serves the purpose of facilitating their removal, but enables the journals to be raised upward in case the edge of the broiler-frames should come in contact with the coals of fire within the stove when revolving or turning said frames in the act of cooking.

Having thus described my invention, what I claim is—

1. The broiler consisting of the semi-cylindrical cover A, provided with the wires C, having the vertical loops D, and the hinged broiler-frames H, having the journals E E, one of which is provided with the handle or crank L, substantially as shown and described, as and for the purposes set forth.

2. The semi-cylindric cover A, provided with the end wires, C, having the vertical loops D, and having the inwardly-bent end portions, F, so as to form a dish or receptacle when reversed, substantially as described, as and for the purposes set forth.

JOHN H. BENTLEY.

Witnesses:
SYLVENUS WALKER,
CHARLES H. TRASK.